United States Patent [19]

van Weelden et al.

[11] 4,340,401
[45] Jul. 20, 1982

[54] BAG-FILTER TYPE DUST COLLECTOR

[75] Inventors: Jan H. van Weelden, Heiloo; Adrianus H. Rietvink, Koedijk, both of Netherlands

[73] Assignee: Estel Hoogovens B.V., IJmuiden, Netherlands

[21] Appl. No.: 201,454

[22] Filed: Oct. 28, 1980

[51] Int. Cl.³ ............................................. B01D 46/04
[52] U.S. Cl. ....................................... 55/305; 55/291; 55/378; 55/302
[58] Field of Search ................... 55/96, 291, 302, 304, 55/305, 341 NT, 378

[56] References Cited

U.S. PATENT DOCUMENTS

| | | | |
|---|---|---|---|
| 1,747,131 | 2/1930 | Parson | 55/304 |
| 2,137,254 | 11/1938 | Turnbull | 55/304 |
| 2,143,664 | 1/1939 | Snyder | 55/304 |
| 3,877,901 | 4/1975 | Snyder | 55/304 |
| 4,217,117 | 8/1980 | Syverson | 55/304 |
| 4,261,714 | 4/1981 | Peterson | 55/302 |

FOREIGN PATENT DOCUMENTS

| | | | |
|---|---|---|---|
| 55-35941 | 3/1980 | Japan | 55/302 |
| 972737 | 10/1964 | United Kingdom | 55/304 |

Primary Examiner—Bernard Nozick
Attorney, Agent, or Firm—Jon M. Lewis

[57] ABSTRACT

A dust-collector of the bag filter type to filter and trap dust and other solid material entrained in flue gases uses a plurality of bags suspended in an array to cooperate with a shaking mechanism. Each bag has an open bottom end and is suspended resiliently taut and in communication with an inlet gas-duct at the bottom; the top of each bag is closed and is exposed to a suction line for venting filtered gases. Periodically, rinsing air is fed into the bags from the suction line to dislodge solid particles and dust deposited on the inner walls of the bags; simultaneously, the bags are given a jolting tipping movement by a gang-operated mechanism which may be manual. Each bag has a resilient coil-spring member mounted vertically above the bag; the spring member is clamped by a vertically extending rod which is mounted for pendular movement about a tipping member which is in the form of a horizontal journal-bearing or a bush mounted for oscillatory movement about its horizontal axis, the tipping member and rod forming part of the shaking mechanism. Pendular movement of the vertically extending rod causes a tilting movement of the associated vertically mounted bag. A coupling plate and beam assembly having a multiplicity of slots engages the vertically extending rods of the bags, one in each slot, above the associated coil-spring member; the coupling plate is manually jolted in a stroke as needed using a handle bar which is used to operate the shaking mechanism manually. The beam assembly has a device to limit its stroke. The gang operated shaking mechanism needs an extremely low operating force and is economical.

25 Claims, 7 Drawing Figures

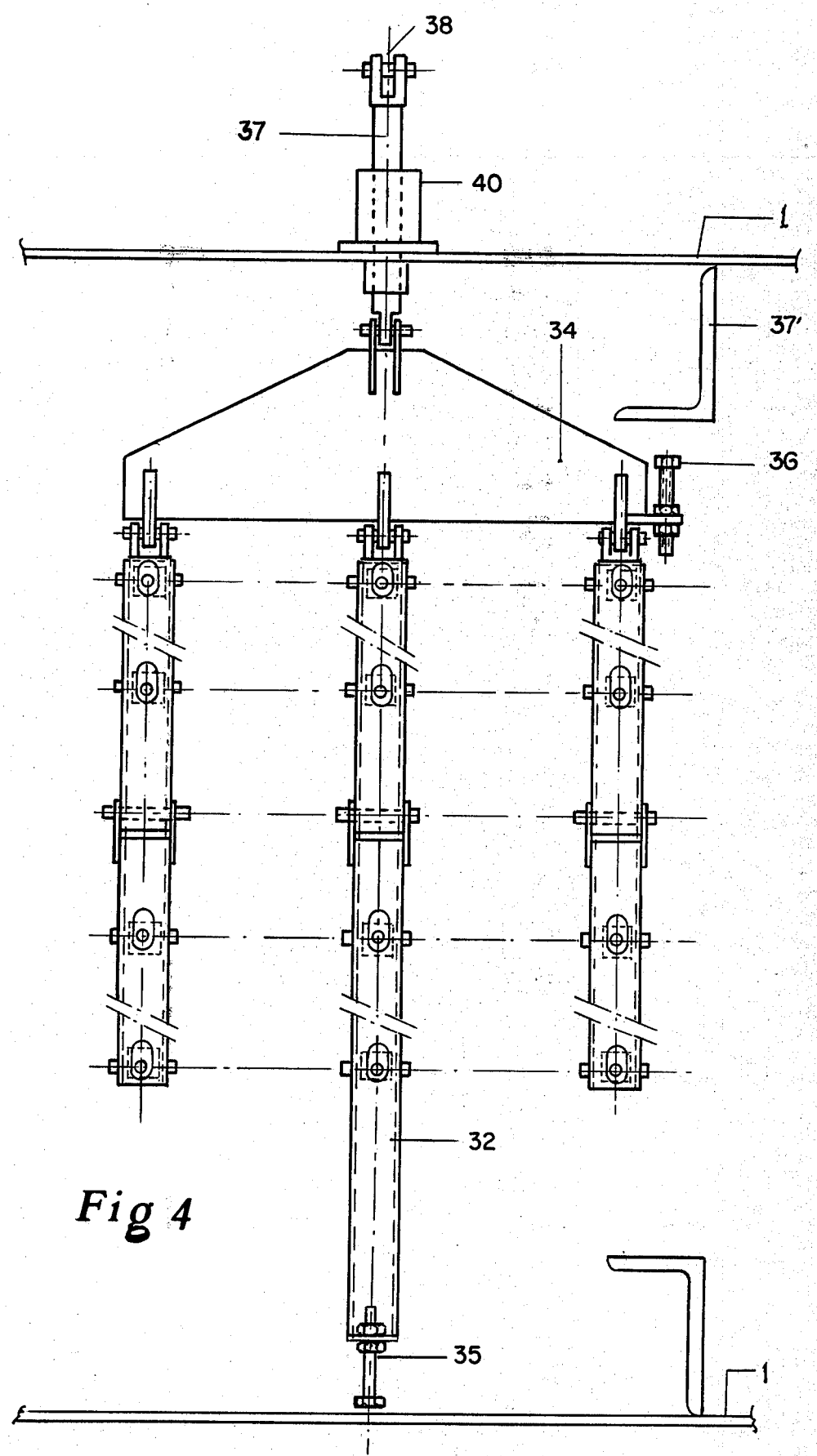

BAG-FILTER TYPE DUST COLLECTOR

BACKGROUND OF THE INVENTION

This invention generally relates to filtering installations for gases containing entrained dust particles and similar solid matter; in particular it concerns an arrangement of the type which uses a plurality of elongate flexible filtering elements, e.g., bags, which are suspended vertically and held resiliently taut while passing gases through the bags from their lower ends for filtering entrained particles. A specific application of such an installation where this invention can be practiced is to filter and clean the exhaust gases of a blast furnace. Such filtering is desirable and in some cases necessary to protect the environment, workmen and equipment. In certain other industrial operations such as smelting and other chemical processes where valuable solids or metals are handled, it is desirable to remove and recover valuable suspended solids which are entrained in product-gases or exhaust-gases.

DESCRIPTION OF PRIOR ART

Filtering installations and dust collecting apparatus generally of the type disclosed herein are well known in prior art. Typically, such an installation consists of a housing or an enclosure in which a plurality of elongate bags made from filtering material or other suitable fabric are suspended from their upper ends by hooks or hangers. The lower ends of the bags are open and are secured in an airtight manner to be in communication with an inlet manifold or plenum which admits the gases to be filtered. The entrained particles which are filtered and caught by the bags on their inner walls accumulate generally at the bottom and are periodically removed. When the accumulation of dust and particles separated from the gases become excessive on the inner walls of the filtering bags, the efficiency of operation of the installation reduces considerably; it then becomes necessary to clean the filtering bags by dislodging the accumulated particles from the inner walls of the bags and removing the particles out of the bags. To this end, flow of dust laden gases into the bags is temporarily interrupted, and a stream of rinsing air is forced down into the bags for purposes of scavenging and removing the accumulated dust particles; simultaneously and desirably, the bags are vigorously shaken or jolted to loosen the accumulated layers of dust and particles which are allowed to fall downwardly through the open bottom ends of the bags into a plenum and then to a receiver, from which the collected dust and particles can be removed from the system. The filtering operation is then resumed.

For purposes of vigorously jolting or shaking the bags when needed, a shaking mechanism is employed in prior art arrangements. A shaking mechanism may be in the form of an industrial vibrator which is connected to impart pulsating movements to all the filtering bags. Shaking mechanisms known in the prior art have been unable to produce uniform and effective vibrations in all the bags, especially when the bags need a significant magnitude of force because of the manner in which they are mounted or suspended. There are other known arrangements wherein a plurality of motorized shaking mechanisms is provided, one for each group of filter bags; such arrangements naturally tend to be uneconomical for installation, maintenance, as well as replacement. Of significance is the fact that the most complicated and expensive item of a filter bag installation is a mechanized or motorized vibrating mechanism.

While it is desirable to provide a vibrating mechanism which is economical, easy to maintain, operate and replace, note should be taken of the fact that the vibrating mechanism should be of such design that does not damage or unduly wear the bags; at the same time, the vibrations imparted should be effective in dislodging accumulated dust material.

A typical prior art dust-collector installation of the motorized type is designed to impart 240 pulses per minute to the assembly of filter bags so as to assist in the removal of accumulated dust which is not dislodged by the rinsing air. While several prior art publications and patents relating to dust-collector installations and shaking mechanisms are known, mention is made of U.S. Pat. No. 2,137,254 to Turnbull.

The patent to Turnbull teaches a plurality of bag filters arranged in series of rows and columns in a housing, the bags being suspended by hangers or hooks depending from rock shafts; each hanger engages and holds a bag at a looped portion of the bag at the top thereof. The top portion of each hanger is eye shaped so as to receive a cooperating eye portion of a bolt which is resiliently biased by an adjustable coil spring to retain each bag vertically taut. Motor operated shaker plates are provided, which impart pronounced agitatory movements at a region of the hanger above each bag, but below the associated coil spring. Each hanger in the Turnbull patent has a horizontal portion forming part of a hook on which the top end of the associated filter bag is folded and stapled or stitched; further, the direction in which agitation is imparted to the filter bags is generally perpendicular to the length of the horizontal portion of the hanger, with the result that the filter bags and the associated support structure offer too much frictional resistance to vibrate smoothly. Consequently, to overcome the high frictional resistance, it is necessary to resort to a motor drive to cause the shaking mechanism to operate. Such an arrangement, in view of its high frictional resistance needs a significant amount of driving force, and does not lend itself to optional manual operation, especially where group-operation or gang-control is considered. Furthermore, in view of the fact that the vibratory movements are imparted to the hanger above each bag and below the coil spring, the fabric of each filter bag may be stressed deleteriously, and, the vibrations may not be as effective as they could otherwise be.

In known prior art installations where effectiveness of imparted vibrations is stressed so as to make dust removal very efficient, invariably, the vibrations or movements which the filter bags are subjected to cause undue fatigue of the bag fabric or material with consequent premature damage to the bags. Therefore, there has been a need for a shaking mechanism, effectively transmitting vibratory movements to the bags at the same time not unduly damaging the bag fabric.

There is also sometimes a need to procure an inexpensive shaking mechanism to replace an existing worn out one which is complicated and expensive to begin with. Occasionally, there may be installations which do not have a shaking mechanism, and it may be desirable to add one that is inexpensive and easy to maintain.

An aspect of the present invention is to provide a shaking mechanism for a dust-filtering installation, which mechanism is inexpensive and capable of manual operation. The shaking mechanism of the present invention can also be used as an add on unit where one does not exist, or it can be used to replace an existing worn-out unit.

A second aspect of the invention is to provide a filtering installation with a shaking mechanism which is simple to operate, has only a few moving parts and requires a relatively small investment cost.

Yet another aspect of the invention is to provide a shaking mechanism wherein the vibratory movements are so imparted and the elements so designed that the friction offered by the elements during operation is minimal; in view of the low frictional resistance of the moving elements, the shaking mechanism of the present invention lends itself for manual operation, especially where the shaking mechanism need be used infrequently, for e.g., around four times a year. Alternatively, if desired, the shaking mechanism of the present invention can be adapted for use with a motor which need be of a much smaller size than needed by comparable prior art installations. By using a smaller sized motor, not only are the initial costs lower, but also the running costs.

The invention in its broad form, with the foregoing aspects in view, consists in a filtering installation for removing entrained dust and particles from a gas stream, the installation being of the type using a plurality of elongate vertically disposed filter bags enclosed in a housing and vertically suspended by rods depending from suspending beams and having suspension means for holding each bag pendant therefrom, the bags having a provision to admit the gas stream at their open lower ends and being capable of taking a reverse flushing air flow from the top periodically as desired, each bag being closed at its top and maintained taut by a resilient tensioning member acting on the associated rod at a location above the bag, the installation comprising a shaking mechanism to tilt the bags in a gang whenever desired, the shaking mechanism including pivotal tipping means disposed above the tensioning member and cooperating with an upper portion of each rod so as to permit pendular movement of the rod about a substantially horizontal axis passing through said pivotal tipping means; and actuating means disposed outside of said housing to actuate said rods as a gang to cause pendular movement of the rods, whereby each bag associated with one of said rods tilts upon operation of the actuating means.

In the preferred embodiment described herein, coupling beams are provided for gang tilting operation of the rods.

By using the novel construction of the shaking mechanism disclosed herein, it is possible to simultaneously shake many more bags (i.e. approximately 10 times as many) than in the case of the known prior art designs, and with equally good results; owing to the elimination of tipping beams and electric motors of the prior art arrangements, the required investment is only a fraction of what it would be for hitherto known constructions.

Preferably, stroke-limiters are provided at the ends on the coupling beams, which limiters are arranged to impinge against the wall of the filter housing. Owing to this impinging action, even the smallest amount of remaining dust in the bags is effectively dislodged from the filter bags.

Advantageously, each coupling beam is designed having a U-profile connected in a hinged manner with the tipping members.

The tipping member preferably comprises a bushing made of Tetrafluoroethylene, commonly known as Teflon, or similar material; the tipping member assembly is preferably disposed on the top end of the suspension rod, whereby friction is of a low magnitude, and interchangeability and replacement of the parts is greatly simplified.

BRIEF DESCRIPTION OF DRAWING

The filtering installation according to the invention will be explained hereinbelow in greater detail with reference to the accompanying drawings showing an example of embodiment, wherein:

FIG. 4 is a diagrammatic plan view of a plurality of small coupling beams secured to a coupling plate;

DESCRIPTION OF PREFERRED EMBODIMENT

The invention can be applied generally in any context to clean particle laden gases or air; in the exemplary embodiment described hereinafter, the invention will be explained with reference to an installation for filtering and cleaning blast-furnace gases.

Figure 1:
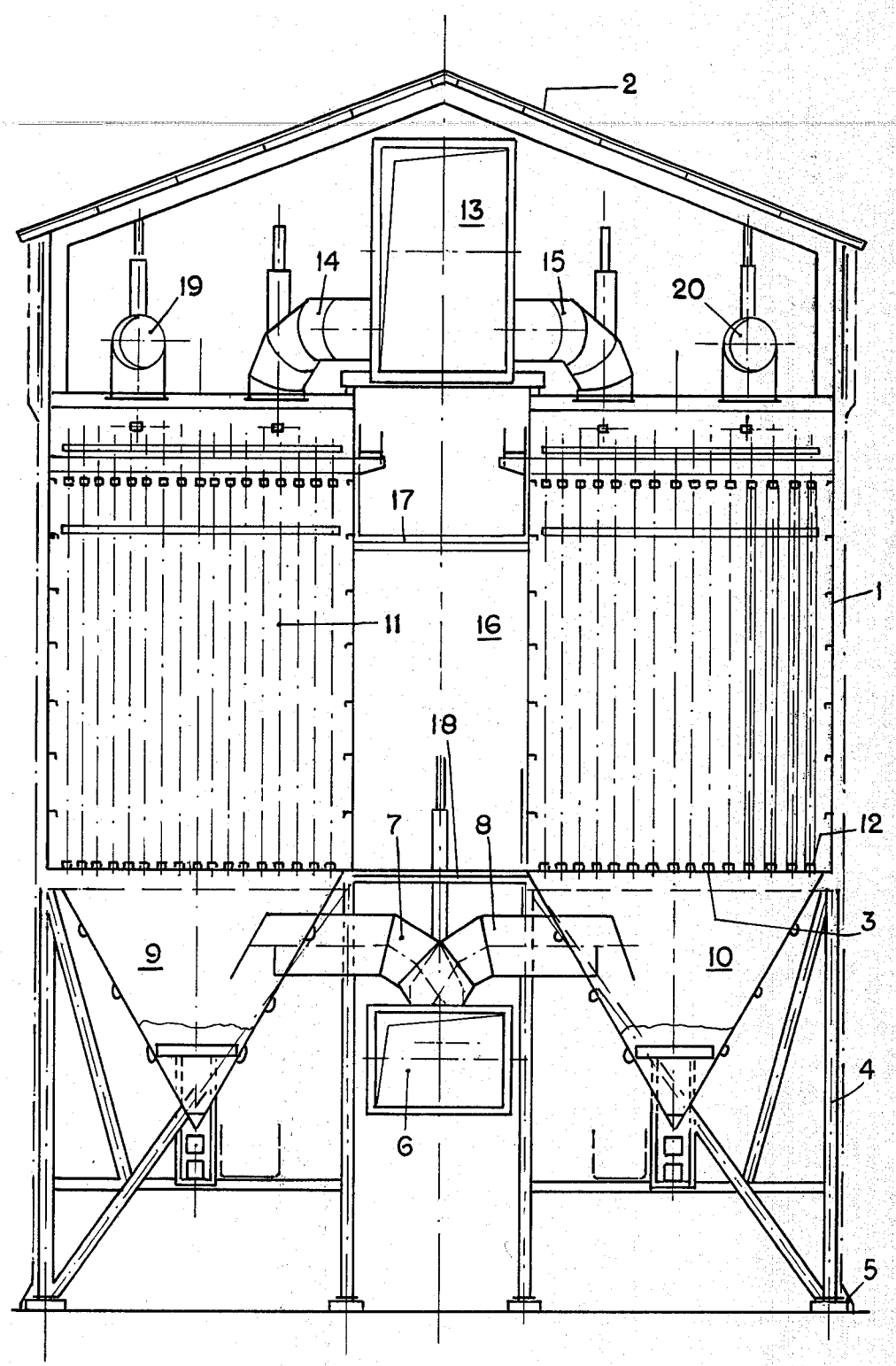
FIG. 1 is a diagrammatic cross-section of a large dust-removal installation in which the invention is applied.

The dust-removal installation illustrated in FIG. 1 applies to a blast furnace, and serves for the cleansing of exhaust gases which emerge above the flue ports, crude iron conduits and fox-holes of a blast furnace; the gases are initially at a high temperature. There are entrained tar particles in the gases, which particles are derived from the said locations; the particles after entering the dust-removal installation adhere to the bags and tend to permanently increase the resistance thereof. During the air rinsing cycle, these tar particles also remain in position on the inner walls of the filter bags and require to be dislodged by shaking. The invention provides a simple, inexpensive and operationally reliable shaking mechanism for this purpose.

The dust-removal installation illustrated in FIG. 1 is disposed in a housing 1 which at its top is covered by a roof 2 and at the underside is sealed off by a floor 3. The housing 1 is disposed on a framework or carrier-construction 4 above the loading platform 5. Below the floor 3 is the feedline 6 for the hot gas to be cleansed; said line 6 bifurcates into lines 7 and 8 which subsequently discharge into funnels or hoppers 9 and 10. Disposed at the lower end of each hopper is a device for the removal of the dust which has been collected.

Suspended and mounted in the housing 1 are a large number (for example 2600) of filter bags 11 arranged in two banks. The bags at their lower end are connected about round pipe members 12 on the floor 3. Attached under the roof 2 is a suction line 13 which, via lines 14 or 15, is connected with the two halves of the filter bank installation. Between the two halves is a chamber 16 which houses travel-tracks 17 and 18 for maintenance on two levels. Disposed under the roof 2, above each half of filter bank are lines 19 and 10 for periodically (for example every 20 minutes), feeding rinsing air for a (predetermined) short length of time to blow the filter bags clean. Furthermore, devices are provided which may be manually actuable from the uppermost travel track 17, for e.g., by shaking, to impart extra cleansing to groups of bags. The structural details of the shaking mechanism, which this invention pertains to, are described hereinafter with reference to a preferred embodiment.

Figure 2:
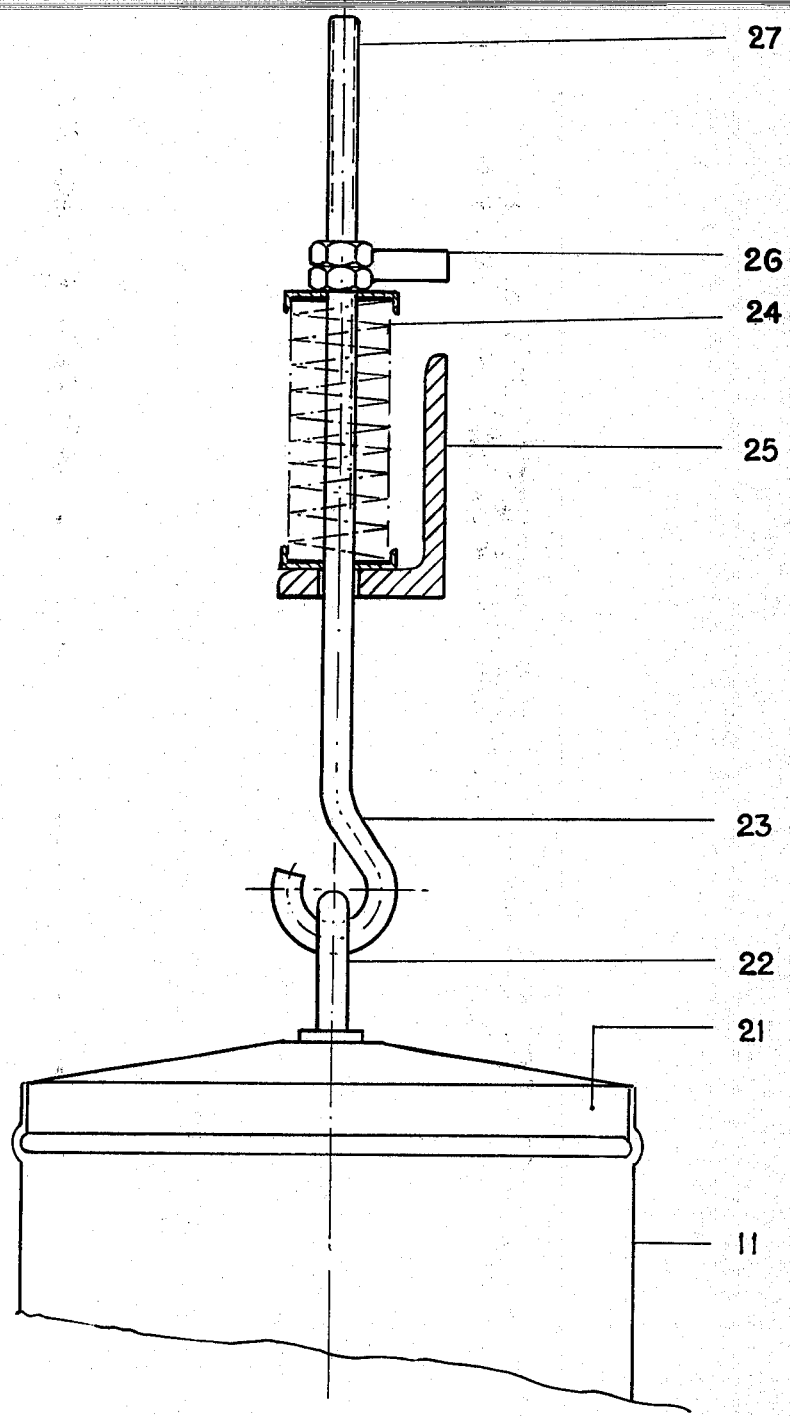
FIG. 2 shows the manner in which a bag is suspended at its top from a beam via a tensioning spring and rod having suspension means for holding each bag pendant therefrom.

As will be apparent from FIG. 2, a filter bag 11, which may be made of suitable fabric or material, is sealed off at its upper end about a dish 21 having an eyelet 22; the eyelet 22 is suspended from a rod 23 having suspending means bearing on a beam 25 via a resilient tensioning member 24. The rod 23 may be in the form of a hook if desired. The degree of tensioning in the filter bag 11 can be adjusted by means of an adjusting nut 26 on the top 27 of the hook 23; any other means of adjusting the tension may alternatively be provided.

Figures 3A, 3B:
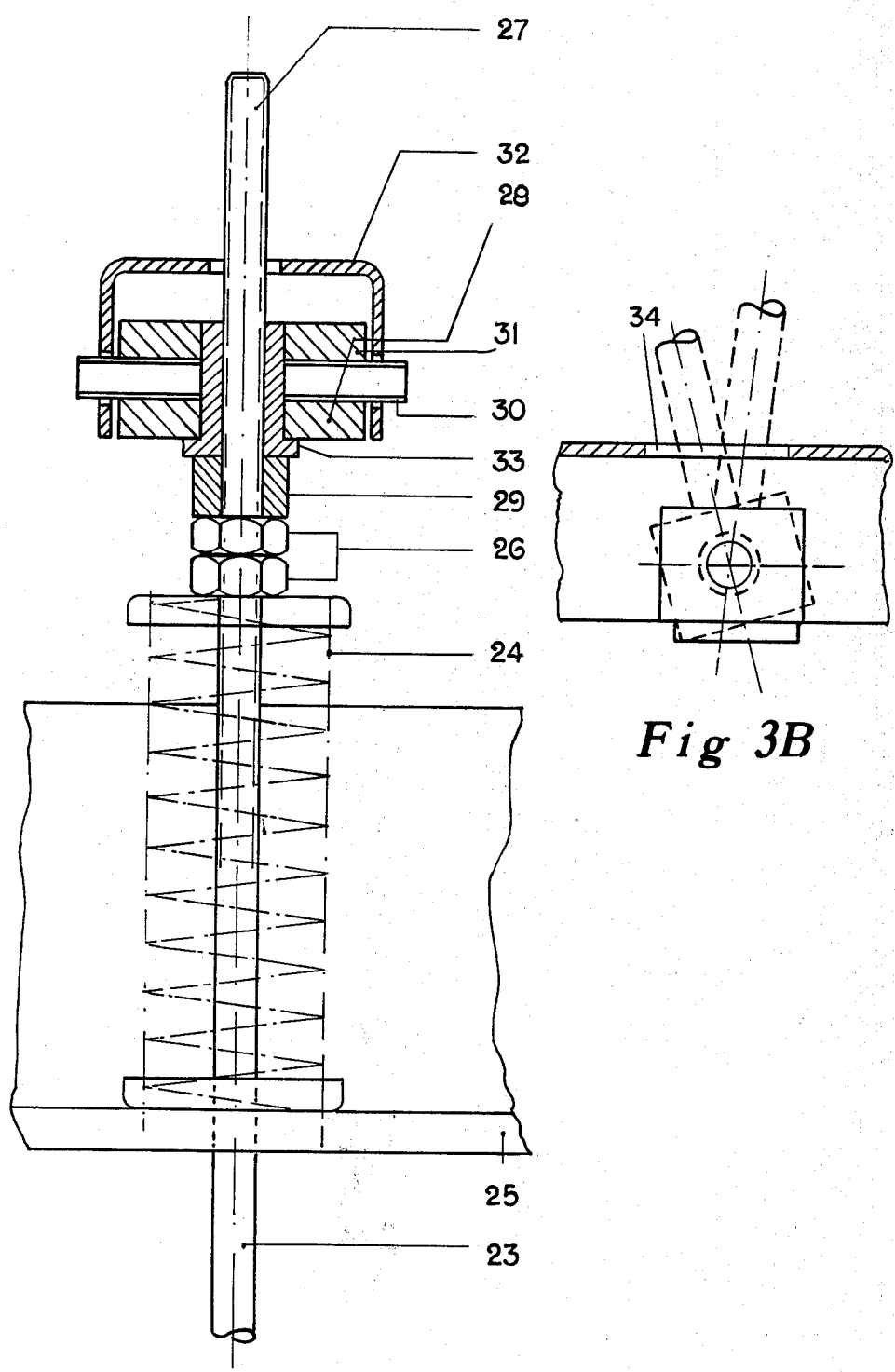
FIG. 3A shows the positioning of a tipping or tilting member and a coupling beam on the top end of a rod.
FIG. 3B is a diagrammatic lateral elevation of the view of FIG. 3A.

Referring to FIG. 3A, which shows the top portion of FIG. 2 drawn to a larger scale, a tilting or tipping member 28 is attached above the tensioning spring 24 and the nuts 26, on the top of the hook 23. A loose spacing bushing 29 can optionally be disposed under the tipping member 28. The tipping member 28 comprises a small square steel block 31 into which are pressed two steel bushings 30 on opposite sides thereof serving as a sleeve bearing or journal bearing about which rod 23 could oscillate with respect to the channel beam 32. Attached in the steel block 31 is furthermore a guide-bushing 33 made from a material such as Tetrafluoroethylene, commonly known as Teflon; the tipping member 28 together with the sleeve bearing assembly is disposed about the top end 27 of the suspension hook 23. The hook member 23 is capable of pendular movement about the axis of the bushings 30. As apparent from FIG. 3A and FIG. 3B, the U-shaped channel or coupling beam 32 is provided with a slot 34 for passage of the top end 27 of the hook 23.

Figure 5:
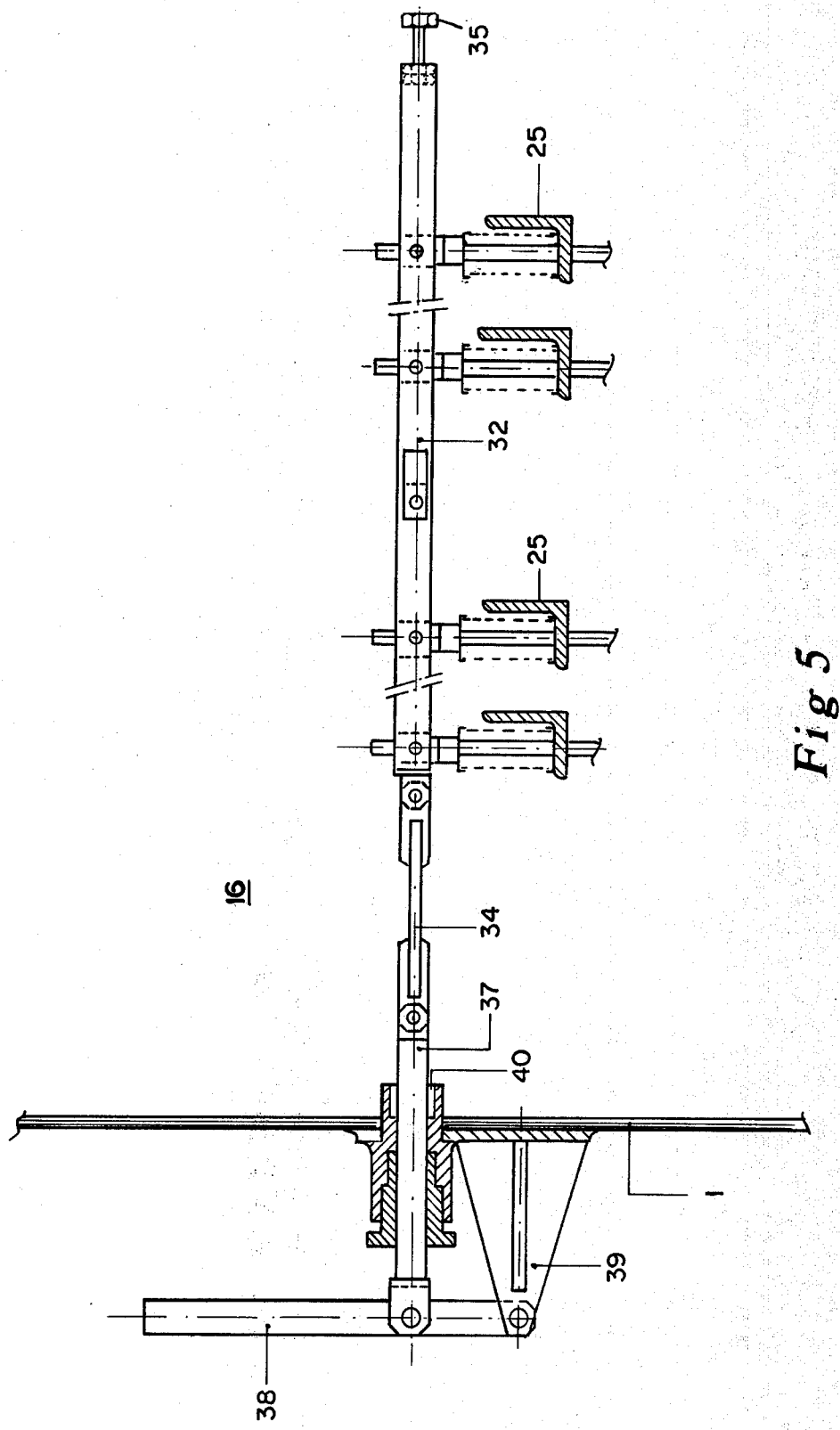
FIG. 5 is a diagrammatic lateral elevation of FIG. 4.

Each coupling beam couples a large number of filter bags suspended in a row with the aid of the small tipping members 28 and is preferably designed to be articulated. FIGS. 4 and 5 show how a plurality (for example 3) of parallelly-extending small coupling beams 32 extending at right angles to the suspension beams 25 is secured to a coupling plate 34 at the end facing the central chamber 16 but is still within the wall of the filter housing 1. As FIG. 4 shows, the middle coupling beam which is designed to be longer is provided with an adjustable stroke-limiter device 35 so as to be able to impinge against the wall of the filter housing 1. Additionally, the coupling plate 34 is provided with an adjustable stroke limiter 36 so as to impinge against a beam 37' mounted in the wall of the filter housing 1.

An extremely significant feature of this invention is the structure which optimally transfers a gentle but firm tipping movement to all the bags without deleteriously affecting the bag fabric-life. The tipping movement for each bag is deliberately applied at the upper end of the rod 27 which is remote from the bag per se. Furthermore, at the time the tipping movement is transferred to the bag, undesirable shocks in the movement would have been attenuated. Also, the pendular movement of the rod 27 which is in turn transmitted to each bag as a tipping movement is made frictionless by the use of the Tetrafluoroethylene, commonly known as Teflon, bushing 33, as well as the members 30 and 31. It should be noted that there is some relative sliding movement between the rod 27 and the bushing 33, which movement is facilitated by the low friction of the Tetrafluoroethylene (commonly known as Teflon), bushing 33. The acceleration of the rod 27 on initially receiving the tipping movement is attenuated by the associated tipping means and structure such that the filtering of the bags is enabled in an optimal frictionless manner without undue stress or wear of the bag fabric.

The coupling plate 34 has preferably the triangular form shown in FIG. 4 and is at the front hinged to a rod 37 which via a seal 40 is guided through the wall of the housing 1. The rod 37 is at the other end hingedly connected with manual operating handle or lever 38 which is secured and hinged at the underside on a bracket 39 on the wall of the housing 1.

Figure 6:
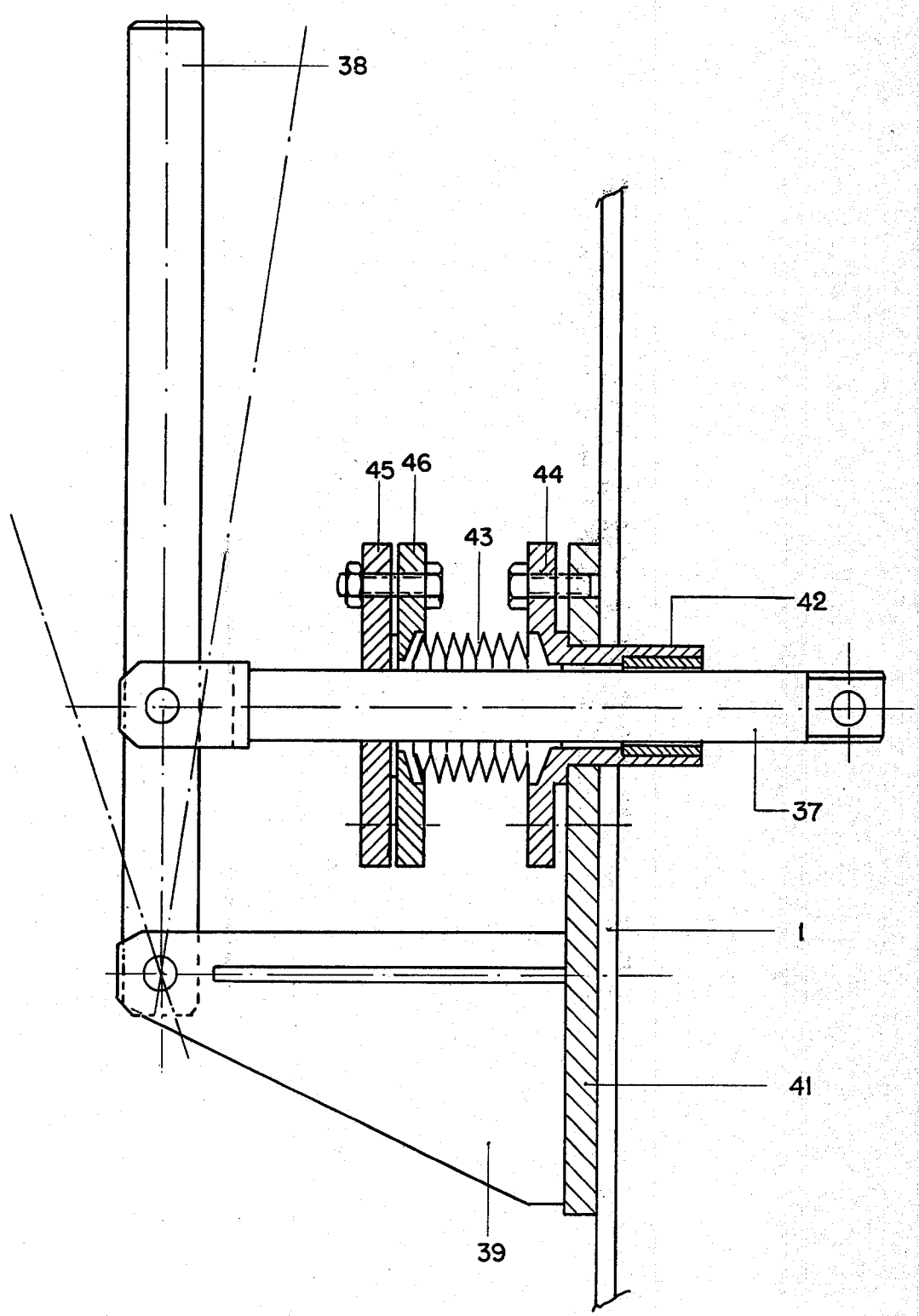
FIG. 6 shows a detail of FIG. 5, drawn to a larger scale.

A preferred design of the seal 40 is shown in FIG. 6. Disposed on the housing 1 is a plate 41 through which with a bushing 42 is mounted; the rod 37 can slide in a closely fitting fashion within bushing 42. A bellows 43 which is sleeve like is attached surrounding the rod 37, one end of the bellows being secured between a press-on ring 44 and the collar of the bushing 42. The other end of the bellows 43 is secured between two rings 45 and 46; ring 45 is welded-fast in an air-tight manner on the rod 37.

By periodically reciprocating the manual operating lever 38 as desired, via the coupling plate and the coupling beams, the filter elements are shaken with a jerky motion at the same time not hurting either the bag seating or the fabric life. The shaking mechanism illustrated and described is simple, inexpensive to provide, requires little maintenance, and is found to be extremely effective in dislodging the accumulated dust.

What is claimed is:

1. A bag filter type dust collector installation for removing entrained dust from a gas-stream, the installation having a plurality of elongate filter bags disposed in a housing and vertically mounted upside down with their openings facing downwards, the bags having a provision to admit the gas stream at their open lower ends and being capable of accepting a reverse flushing air flow from the top periodically as desired, the bags being suspended to be resiliently taut by rods depending from suspending beams, each rod having a suspension means holding a bag pendant therefrom, the installation including a shaking mechanism to tilt the bags in a gang whenever desired to dislodge dust accumulated on the inner walls of said bags, the installation further including:

a spring coil member having an adjustable tensioning means to hold each bag suspended taut, said spring coil member being disposed above an associated filter bag, each said rod passing axially through the spring coil member and having a vertical extension protruding above the spring coil;

at least one coupling channel beam having a web portion and a row of slots in the web portion, the coupling beam being mounted above the suspending beams and at substantially right angles thereto, so as to enable each said rod extension to engage in one of said slots;

pivotal tipping means comprising a member containing a bushing which vertically guides each rod extension therethrough, said member being mounted on said coupling channel beam for pivotal movement about a horizontal axis through said member so as to permit pendular movement of each rod extension about its corresponding associated horizontal axis, and means connected to said coupling channel beam to cause back and forth shuttling movement thereof so as to simultaneously tip all the rod extensions engaged in said slots to cause a jerky tilting of the plurality of filter bags.

2. A dust collector installation as in claim 1 which includes a plurality of filter bags arranged in rows and columns, and including a plurality of parallelly disposed coplanar coupling channel beams having means to operate the plurality of channel beams simultaneously.

3. A dust collector installation as in claim 2, wherein said bushing is made of Tetrafluoroethylene.

4. A dust collector installation as in claim 2 wherein said means to operate plurality of channel beams simultaneously comprises a horizontally disposed plate rigidly connecting all the coplanar coupling beams.

5. A dust collector as in claim 3 including a shaft connected to said plate, said shaft being disposed to emerge from said housing through a bellows-type seal, the installation including manually operable means located outside of said housing and connected to said shaft.

6. A filtering installation for removing entrained dust or particles from a gas stream, the installation having a plurality of elongate vertically disposed filter bags enclosed in a housing and vertically suspended by rods depending from suspending beams, each rod having suspension means holding a bag pendant therefrom, the bags having a provision to admit the gas stream at their open lower ends and being capable of accepting a reverse flushing air flow from the top periodically as desired, each bag being closed at its top and maintained taut by a resilient tensioning member acting on the associated rod at a location above the bag;
the installation further comprising a shaking-mechanism
  to tilt the bags in a gang whenever desired, the shaking mechanism including pivotal tipping means disposed above the tensioning member and cooperating with an upper portion of each rod so as to permit pendular movement of the rod about a substantially horizontal axis passing through said pivotal tipping means;
and actuating means disposed outside of said housing to actuate said rods as a gang to cause pendular movement of the rods whereby each bag associated with its rod tilts upon operation of the actuating means.

7. A filtering installation as in claim 6 wherein said resilient tensioning member includes means to adjust the tension thereof so that an associated filter bag can be held in tension the degree of which can be altered as desired.

8. A filtering installation as in claim 6 wherein the plurality of vertically disposed filter bags are arranged in rows and columns, and wherein the resilient tensioning members of the plurality of filter bags are supported by a plurality of substantially parallel suspending beams.

9. A filtering installation as in claim 8, including a plurality of coupling beams disposed parallelly and at right angles to said suspending beams, each coupling beam having a row of slots, each slot receiving therein a vertical extension of one rod, whereby, by shuttling each coupling beam back and forth, the slots of the coupling beam enable the rod-extensions received therein to oscillate back and forth causing a pendular movement of the rods associated with each coupling beam.

10. A filtering installation as in claim 9 wherein each coupling beam has a U-profile and cooperates with a plurality of said pivotal tipping means, and wherein each pivotal tipping means is pivotally associated with said coupling beam.

11. A filtering installation as in claim 10 wherein each said pivotal tipping means comprises a Tetrafluoroethylene bushing in which said vertical extension of a hook passes, so as to render the relative axial movement between said rod extension and the Tetrafluoroethylene bushing substantially frictionless, during gang operation of said shaking mechanism.

12. A filtering installation as in claim 11 wherein said plurality of coupling beams are disposed in a horizontal plane, the installation including a coupling plate rigidly connecting the plurality of said coupling beams at one end of the beams, whereby, by moving the coupling plate back and forth in forward and reverse strokes, the coupling beams also are enabled to move back and forth.

13. A filtering installation as in claim 9 wherein said plurality of coupling beams are disposed in a horizontal plane, the installation including a coupling plate rigidly connecting the plurality of said coupling beams at one end of the beams, whereby, by moving the coupling plate back and forth in forward and reverse strokes, the coupling beams also are enabled to move back and forth.

14. A filtering installation as in claim 12 including adjustable means to limit a forward stroke of the coupling beams which are connected.

15. A filtering installation as in claim 14 wherein said adjustable means cooperates with a stop mounted on said housing which encloses the filter bags.

16. A filtering installation as in claim 14 further including adjustable means to limit a reverse stroke of the coupling beams which are connected.

17. A filtering installation as in claim 15 wherein said adjustable means cooperates with a stop mounted on said housing which encloses the filter bags.

18. In a filtering installation for removing entrained dust or other particles from a gas stream, the installation having a plurality of vertically mounted inverted filter bags enclosed in a housing and suspended by rods depending from suspending beams, each rod having suspension means holding each bag pendant therefrom, the bags having a provision to admit the gas stream at their open lower ends and being capable of accepting a reverse flushing air flow from their top periodically as desired, each bag being closed at its top and maintained taut by a resilient tensioning member acting on the rod at a location above the bag, the improvement consisting in a shaking mechanism provided to periodically tilt the filter bags to dislodge particles that have adhered to the inner walls of the bags, the shaking mechanism comprising:
  pivotal tipping means associated with an upper portion of each said rod and disposed above the resilient tensioning member so as to permit pendular movement of each said rod about a horizontal axis through the pivotal tipping means;
and actuating means which can be operated from outside the housing to cause pivotal gang movement of all the rods, whereby the bags receive a tilting jerky motion through the pendular movement of said upper portions of the rods to dislodge particles adhering to the inside of the bags.

19. A filtering installation as in claim 18 wherein said plurality of bags are arranged in rows and columns, the installation including coupling beams, each beam disposed to gang-operate the tipping means of bags which are in a row.

20. A filtering installation as in claim 19 wherein said coupling beams are adapted for limited back and forth movement, the coupling beams being provided with adjustable means to limit the stroke of their back and forth movement.

21. A filtering installation as in claim 20 wherein said tipping means of bags which are in a row are pivotally attached to an associated coupling beam, the coupling beam having a U-shaped profile having a web portion.

22. A filtering installation as in claim 21 wherein each pivotal tipping means includes a Tetrafluoroethylene bushing through which said upper portion of an associated hook passes.

23. A filtering installation as in claim 22 wherein each coupling beam has a row of slots in its web portion, each slot accommodating in assembly an upper portion of an associated rod.

24. A filtering installation as in claim 19 including a coupling plate which fastens said coupling beams at their one end in spaced parallel relationship.

25. A filtering installation as in claim 23 including a bellows-seal in the housing, and a shaft passing through the seal, said shaft being connected with said coupling plate for enabling gang operation of said tipping means manually from outside of the housing.

* * * * *